US008711399B2

(12) United States Patent
Keller et al.

(10) Patent No.: US 8,711,399 B2
(45) Date of Patent: Apr. 29, 2014

(54) ADAPTIVE TAKE-OFF STRIPS FOR SMOOTHING INK CONSUMPTION

(75) Inventors: Guido Keller, Watt (CH); Anna Maria Ayuso, Arlington, MA (US); Jonathan H. Chen, Brighton, MA (US); Ciaran Daly, Windsor (CA); Vyacheslav Nykyforov, Littleton, MA (US); Anatoliy V. Tsykora, Wayland, MA (US); Marinus H. van Rooij, Gelsrop (NL); Johan Roelof Wiersema, Waalre (NL)

(73) Assignee: Vistaprint Schweiz GmbH, Winterthur (CH)

( * ) Notice: Subject to any disclaimer, the term of this patent is extended or adjusted under 35 U.S.C. 154(b) by 649 days.

(21) Appl. No.: 12/715,376

(22) Filed: Mar. 1, 2010

(65) Prior Publication Data

US 2011/0209636 A1 Sep. 1, 2011

(51) Int. Cl.
*G06F 15/00* (2006.01)

(52) U.S. Cl.
USPC .......................................................... 358/1.15

(58) Field of Classification Search
USPC ................................................ 358/3.29, 1.15
See application file for complete search history.

(56) References Cited

U.S. PATENT DOCUMENTS

| | | | | |
|---|---|---|---|---|
| 6,181,888 | B1 | 1/2001 | Scheuer et al. | |
| 2003/0107772 | A1 * | 6/2003 | Shimazaki et al. | 358/3.29 |
| 2006/0152776 | A1 | 7/2006 | Bailey | |
| 2008/0127846 | A1 | 6/2008 | Nagal | |

* cited by examiner

*Primary Examiner* — Saeid Ebrahimi Dehkordy
(74) *Attorney, Agent, or Firm* — Jessica Costa

(57) ABSTRACT

Take-off strips are adaptively generated based on the color profile of the image to be printed to smooth ink consumption and present a more constant ink coverage and ink flow. Adaptive take-off strips have complementary color profiles to the image being printed.

23 Claims, 5 Drawing Sheets

ADAPTIVE TAKE-OFF STRIPS FOR SMOOTHING INK CONSUMPTION

Offset printing is often used for printing long production runs of printed products. Offset printing is a technique in which an inked image is transferred (or "offset") from a plate to an intermediate plate (usually a roller wrapped in a rubber blanket), and then to the actual surface on which the image is to be printed. When used in combination with a lithographic process, which is based on the repulsion of oil and water, the offset technique employs a flat (planographic) image carrier on which the image to be printed obtains ink from ink rollers, while the non-printing area attracts a water-based film (called "fountain solution"), keeping the non-printing areas ink-free.

FIG. 1 illustrates a typical offset printing configuration 100. As illustrated, the offset printing press includes one or more ink rollers 108 and one or more water rollers 110 which apply ink and water to a plate cylinder 102 as it spins. The plate cylinder 102 is typically a metal cylinder such as steel or aluminum wrapped in a lithographic plate 130 etched to form ink-repellent (hydrophilic) areas 132 (the etched portion) and ink-accepting areas 134 (the non-etched portions). The plate cylinder 102 rotates, thereby passing the plate under a source of water 140 and a source of ink 142. The hydrophilic areas 132 of the plate 130 fill with water 140. The ink 142 adheres to the remaining ink-accepting areas 134. The plate 130 offsets the image onto blanket cylinder 104 (comprising a metal cylinder wrapped in a rubber blanket). A printing substrate 120 (such as paper) passes between the blanket cylinder 104 and an impression cylinder 106. The printing substrate 120 is compressed between the blanket cylinder 104 and impression cylinder 106 such that as the cylinders rotate, the printing substrate 120 is conveyed past the cylinders, and the rubber blanket 105 actually transfers the image onto the printing substrate 120.

The offset press configuration shown in FIG. 1 allows the printing of only a single color at a time. In order to print multiple colors onto the printing substrate 120, a different instance of the press configuration must be employed for each color. While the same press could be used for each desired color by switching out the ink 142 and changing the lithographic plate 130, such a process is cumbersome, and therefore industrial presses (such as shown in FIG. 2) typically provide one offset printing configuration 100 such as shown in FIG. 1 for each print color.

Typically, a four-color printing model is used to reduce the number of ink colors required while allowing a broad spectrum of allowable colors in an image to be printed. The standard four-color printing model utilized in the printing industry is the CMYK color model, including three secondary colors (Cyan (C), Magenta (M), and Yellow (Y)) and black (K).

In order to print a full color image, the colors of the image must be separated into the CMYK color components. The process of color separation starts by separating the original artwork into red, green, and blue components (for example by a digital scanner), resulting in three separate grayscale images, which represent the Red, Green, and Blue (RGB) components of the original image. Cyan, Magenta, and Yellow are subtractive primaries which each represent two of the three additive primaries (RGB) after one additive primary has been subtracted from white light.

A negative image of each of the image separations is then created. When a negative image of the red component is produced, the resulting image represents the Cyan component of the image. Likewise, negatives are produced of the green and blue components to produce Magenta and Yellow separations, respectively.

Large industrial CMYK offset presses generally provide one offset printing configuration (such as 100 shown in FIG. 1) for each color to be printed. Accordingly, a CMYK press 200 includes four offset printing configurations 100—one for each ink color (Cyan, Magenta, Yellow, and Black) 100*a*, 100*b*, 100*c*, 100*d*—as illustrated symbolically in FIG. 2. A lithographic plate 130 is created for each negative color separated image. Typically, the lithographic plate 130 is an aluminum plate that is etched with the negative color separated image. Each plate 130 is wrapped around the plate cylinder 102 of its offset printing configuration 100*a*, 100*b*, 100*c*, 100*d* of the corresponding ink color.

Offset printing presses are typically used for long production run jobs—that is, for printing a large quantity of sheets of material printed with the same image. The reasons for this are multi-fold. First, as explained above, images to be printed must be separated into their component colors and a separate plate must be created for each color-separated image. Obviously, this requires a significant investment in terms of both time and money. Second, as will be discussed in more detail hereinafter, the setup time for each print job is lengthy—typically requiring between 8 and 15 minutes between print jobs to change plates and to ready the ink. Additionally, the ink-readying process, which involves printing up to several hundred scrap sheets to prime the ink wells for the particular image to be printed, generates much undesired waste. Thus, in order to maximize return on investment in terms of expense and time, and to reduce the printed waste overhead, offset printing is typically restricted to long production runs of any particular print job. Shorter print jobs (i.e., printing only a small quantity of an image) are typically fulfilled using digital printers.

As just described, many scrap (or "make-ready") sheets are wasted during setup of an offset printing press in order to prime the ink wells and to run out the ink currently on the blankets. Ink well priming is important for producing consistent color over the entire run of printed documents. Offset printing ink is characterized by high viscosity due to the ink binders used to ensure adequate cohesive and adhesive ink properties, which means that it takes some time for ink to flow out of the ink wells. At the beginning of a print job, the color characteristics of the image in the previous print job will determine how much and how fast ink was flowing in each of the ink wells during the previous run. If the color characteristics of the next print job require more or less ink flow in any of the ink wells, it will take time to adjust the ink flow in each of the wells. Many factors, such as variation in ink feed, printing pressure, humidity, temperature, and ink absorption by the paper, influence the size of each dot of ink. Variation in the size of the dots of ink results in color shift. As the ink flow in each well ramps up or ramps down in flow to the desired flow, the dot size output by the ink well changes, resulting in a visible color shift in succeeding prints of an image over time. Additionally, because of the adhesive properties of the ink, ink sticking to the blanket from the previous print job can interfere with the printed image of the current print job.

To overcome this problem, a number of prints (called "make-ready sheets") are first printed, which are then discarded, prior to printing sheets designated for actual production. There may be hundreds of make-ready sheets that must be printed to adequately prime the ink wells such that the previous job's ink is taken up from the blankets and the desired color quality is achieved in the production prints.

In addition to color variation between different print jobs and between different prints in a given print job, color variation may even occur within a single print itself. In this regard, the content of the image can also affect variation in the printed color. For example, images having large areas of a color that suddenly change from a low ink profile (e.g., no or low ink) to a high ink profile (e.g., full or high color) as the sheet passes the ink well can result in a color shift within the print itself as the ink flow ramps up.

For all of the forgoing reasons, it would be desirable to have techniques available that would assist in reducing color variation between print jobs, between prints in a given print run, and within each print of a print run while also reducing the number of make ready sheets required for each print job.

SUMMARY

The present invention is a novel method and system for improving color consistency and reducing color variation between and within prints printed by an offset printing press by smoothing ink consumption through the use of an adaptive take-off strip which is generated by adaptively determining a complementary color profile to the image to be printed and printing the adaptive take-off strip and image on the same sheet of material such that printing the complementary color profile of the take-off strip smoothes the ink consumption when the image is printed.

In an embodiment, a method for adaptively generating a take-off strip for printing on a sheet of material along with an image includes obtaining a color profile of the image, determining a complementary color profile to the color profile of the image, and generating a take-off strip embodying the complementary color profile.

In another embodiment, one or more computer readable storage mediums tangibly embody program instructions that, when executed by one or more processors, perform the above method.

In yet another embodiment, a system for adaptively generating a take-off strip for printing on a sheet of material along with an image includes one or more processors configured to obtain a color profile of the image, determine a complementary color profile to the color profile of the image, and generate a take-off strip embodying the complementary color profile.

DETAILED DESCRIPTION

Figure 3:
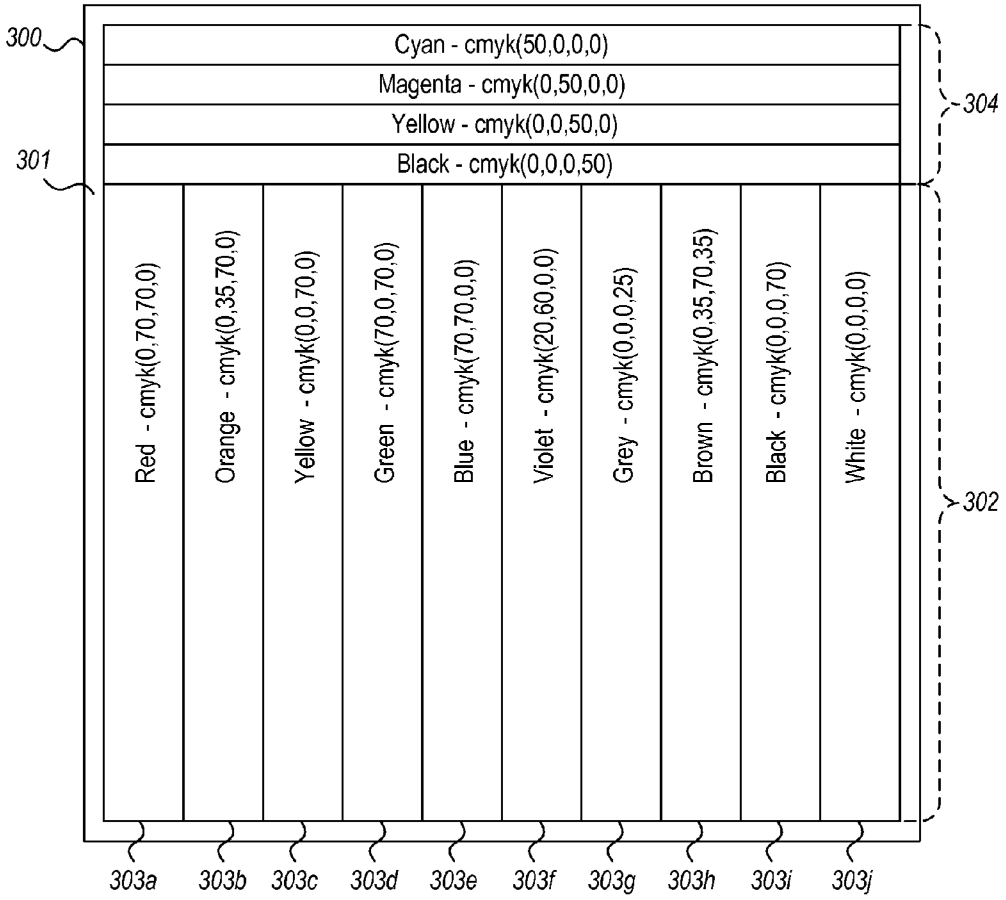
FIG. 3 is an exemplary embodiment of a sheet of material containing a content image and a prior art take-off strip.

FIG. 3 illustrates an example sheet of material 300 having printed thereon an image 302 that will be processed into a product (the "product image portion") and a prior art take-off strip 304. The product image portion 302 of the sheet of material will be retained and processed into one or more products. For example, the product image portion 302 of the sheet may comprise one or more folder images that will be separated from one another and from any non-product image portions (e.g., 301 and 302) of the sheet of material 300, and which are subsequently folded to form presentation folders (i.e., the "products"). In practice, the product image portion 302 will typically comprises many different areas containing many different colors. For simplicity of explanation, in the illustrative embodiment, the product image portion includes several different regions 303*a*-303*j* of different colors. Specifically, region 303*a* is a red color printed with the CMYK color separation amounts of 0% Cyan, 70% Magenta, 70% Yellow, and 0% black (indicated by the notation cmyk(0,70, 70,0)). Region 303*b* is an orange color defined as cmyk(0,35, 70,0). Region 303*c* is a yellow color defined by cmyk(0,0,70, 0). The remaining regions 303*d*, 303*e*, 303*f*, 303*g*, 303*h*, 303*i*, 303*j* are green, blue, violet, grey, brown, black, and white, respectively, having CMYK values as illustrated in FIG. 3.

As also shown in FIG. 3, in the prior art the take-off strip 304 comprises equal parts of each CMYK color separation at approximately 50% coverage (i.e., cmyk(50,0,0,0), cmyk(0, 50,0,0), cmyk(0,0,50,0), cmyk(0,0,0,50)). In the prior art, the take-off strip 304 is a standard composition of colors in a standard layout, for example as shown, and since the same standard take-off strip is used for every image regardless of image content, the color and layout of the take-off strip 304 bears no relationship to the color profile of the image 302 to be printed.

Figure 4:
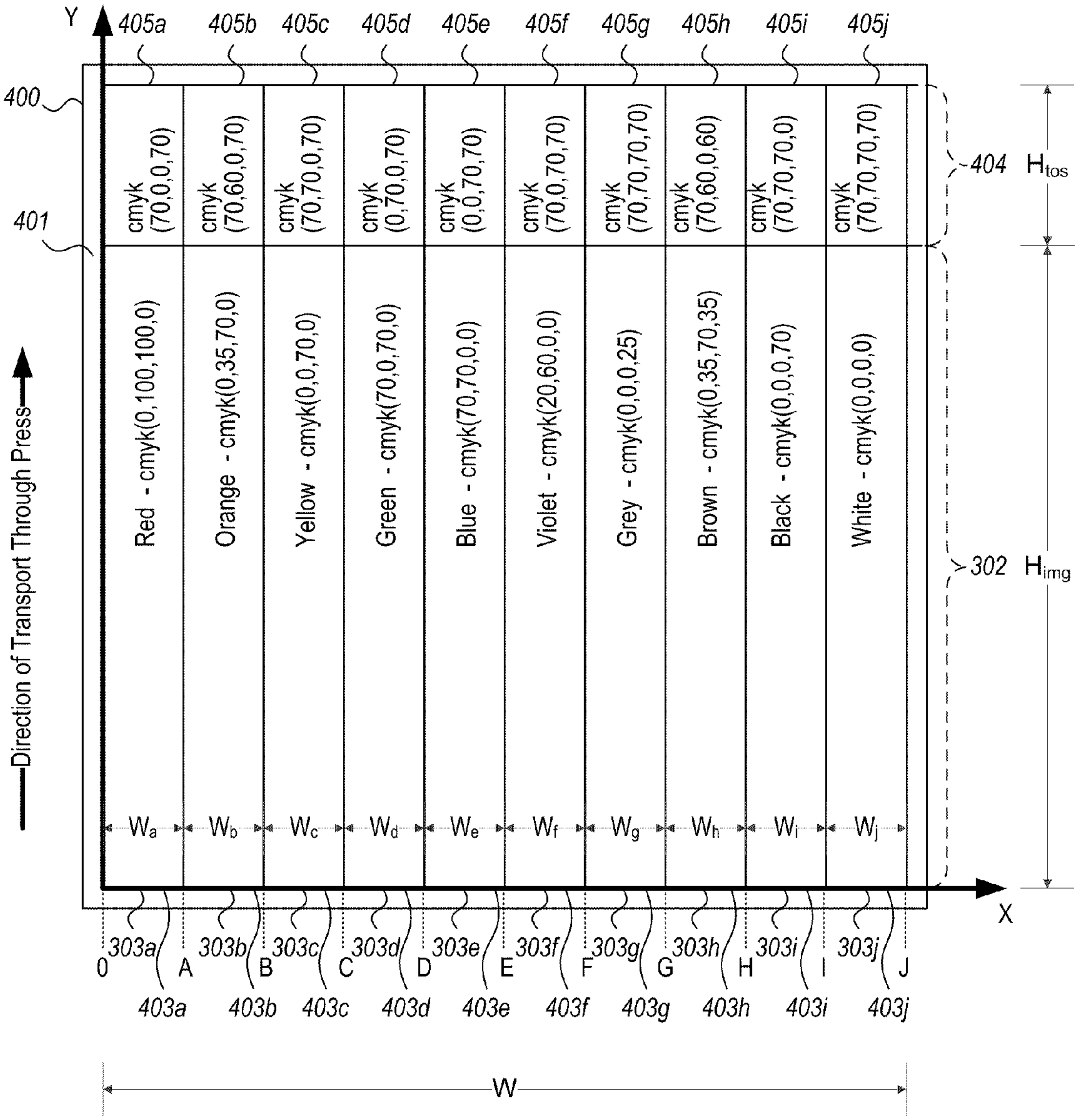
FIG. 4 is an exemplary embodiment of a sheet of material containing a content image and an adaptive take-off strip implemented in accordance with the principles of the invention.

FIG. 4 illustrates an exemplary embodiment of an example sheet of material 400 having printed thereon the same product image portion 302 of FIG. 3 and an exemplary adaptive take-off strip 404 embodying aspects of the invention. For purposes of explanation, when laid out flat, the sheet of material lies in a plane defined by two axes—the horizontal X-axis, and the vertical Y-axis—as illustrated in FIG. 4. When the sheet of material is passed through the press, the X-axis corresponds to the axis of rotation of the plate, blanket, and impression cylinders (which should all lie in parallel to one another), whereas the Y-axis corresponds to the direction of transport of the sheet past the cylinders.

As illustrated, the adaptive take-off strip 404 embodies a complementary color profile of the content of the product image portion 302. The take-off strip 404 is aligned to span, along the X-axis, at least the width W of the product image portion 302, and up to the entire width of the sheet 400. The take-off strip 404 is positioned such that it is printed immediately prior to the product image portion 302. In alternative embodiments, the take-off strip 404 may be positioned such that it is printed following the product image portion 302 (in order to perform the take-off function for the next sheet to be printed), or may be positioned between two or more portions of the product image portion 302 (in the case where the product image portion includes multiple areas that will be separated from one another after printing).

In an embodiment, the product image portion 302 is partitioned into a plurality of vertical ink key regions (i.e., columns) 403*a*-403*j* (which happen to coincide in the illustrative embodiment with regions 303*a*-303*j*). A vertical ink key region is a rectangle spanning a segment $W_a$, $W_b$, $W_c$, $W_d$, $W_e$, $W_f$, $W_g$, $W_h$, $W_i$, $W_j$ of the product image portion 302 along the x-axis and spanning the entire height $H_{img}$ of the product image portion along the y-axis. Correspondingly, the adaptive take-off strip 404 is partitioned into a respective plurality of vertical complementary ink regions 405*a*-405*j*, each associated with a respective vertical ink key region 403_a_-403_j_. Each vertical complementary ink region 405_a_-405_j_ spans the same x-axis segment as its associated vertical ink key region 403_a_-403_j_ and the entire height $H_{tos}$ (along the y-axis) of the adaptive take-off strip 404. One or more, and preferably all, vertical complementary ink regions 405_a_-405_j_ in the adaptive take-off strip 404 have a complementary color profile to the color profile of their corresponding vertical ink key regions 403_a_-403_j_ in the product image portion of the sheet.

The product image portion includes several different areas of different colors. Preferably, the product image portion 302 is partitioned into vertical ink key regions such that the overall color profile along the y-axis is substantially similar at any point of the vertical ink key region 403_a_-403_j_ along the x-axis. For example, with reference to FIG. 4, a first vertical ink key region 403_a_ is defined for area 303_a_, since the color profile at 0<X<A is substantially the same, in this case the color red (cmyk(0,70,70,0)), but changes drastically at X>A. A corresponding vertical complementary ink region 405_a_ is defined in the adaptive take-off strip between 0<X<A having a complementary color profile (cmyk(70,0,0,70) to that of vertical ink key region 403_a_. Similarly, a second vertical ink key region 403_b_ may be defined for area 303_b_ at A<X<B, since the color profile (cmyk(0, 35, 70, 0) in area 303_b_ is substantially similar within the region yet substantially different outside the region. A corresponding vertical complementary ink region is defined in the adaptive take-off strip between A<X<B having a complementary color profile (cmyk(70, 60, 0, 70) to that of vertical ink key region 403_b_. Similarly, vertical ink key regions 403_c_-403_j_ may be defined for areas 303_c_-303_j_, with corresponding vertical complementary ink regions 405_c_-405_j_ defined in the adaptive take-off strip 404 and having respective complementary color profiles to the color profiles of their corresponding vertical ink key regions 403_c_-403_j_.

More regions could be defined to accommodate finer-grained color profile diversity. This would be especially appropriate for images that have more diversity in color profiles.

Figure 5:
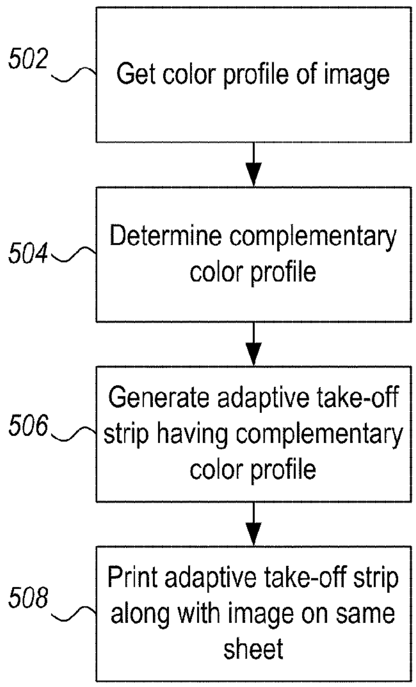
FIG. 5 is an exemplary embodiment of a method for adaptively generating a take-off strip for an image to be printed.

FIG. 5 shows an exemplary method for adaptively generating a take-off strip for an image to be printed. As illustrated, the color profile of the product image portion of the sheet is obtained (step 502). Once the color profile of the image is acquired, the complementary color profile is then determined (step 504). A take-off strip embodying the complementary color profile is then generated (step 506). The take-off strip's ink coverage is thus based on the content of the image. The take-off strip is then printed along with the image on the same sheet (step 508).

Figure 6:
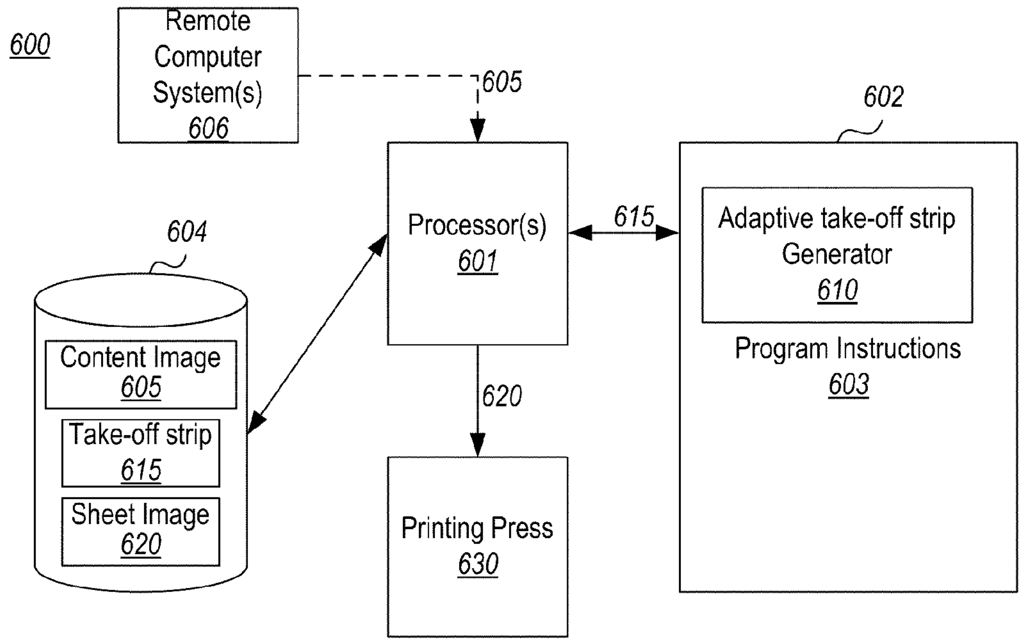
FIG. 6 is a block diagram of a system for adaptively generating take-off strips based on an image to be printed.

FIG. 6 is a block diagram of a system 600 for adaptively generating take-off strips based on an image to be printed. The image to be printed may be a single image, or may be combined with other images to be printed on the same sheet of material and to be processed into one or more products. In either case, the image(s) to be printed and processed into one or more products are referred to for purposes of FIG. 6 as the "content image" 605.

As illustrated in FIG. 5, the system includes one or more processors 601 which execute computer-readable program instructions 603 tangibly embodied in one or more computer readable storage mediums 602. Included in the instructions is an adaptive take-off strip generator 610 having program instructions instructing the processor(s) 601 to receive a content image 605 to be printed. The content image 605 may be stored in computer readable storage 602, which may be accessible by the processor(s) 601, or alternatively may be transmitted to the processor(s) 601 by a remote computer, where it is then stored and accessed locally in the storage 602 during the adaptive take-off strip generation. The program instructions 603 include instructions implementing an adaptive take-off strip generator 610.

Alternatively, the adaptive take-off strip generator 610 may be implemented in hardware, such as an ASIC.

Figure 7:
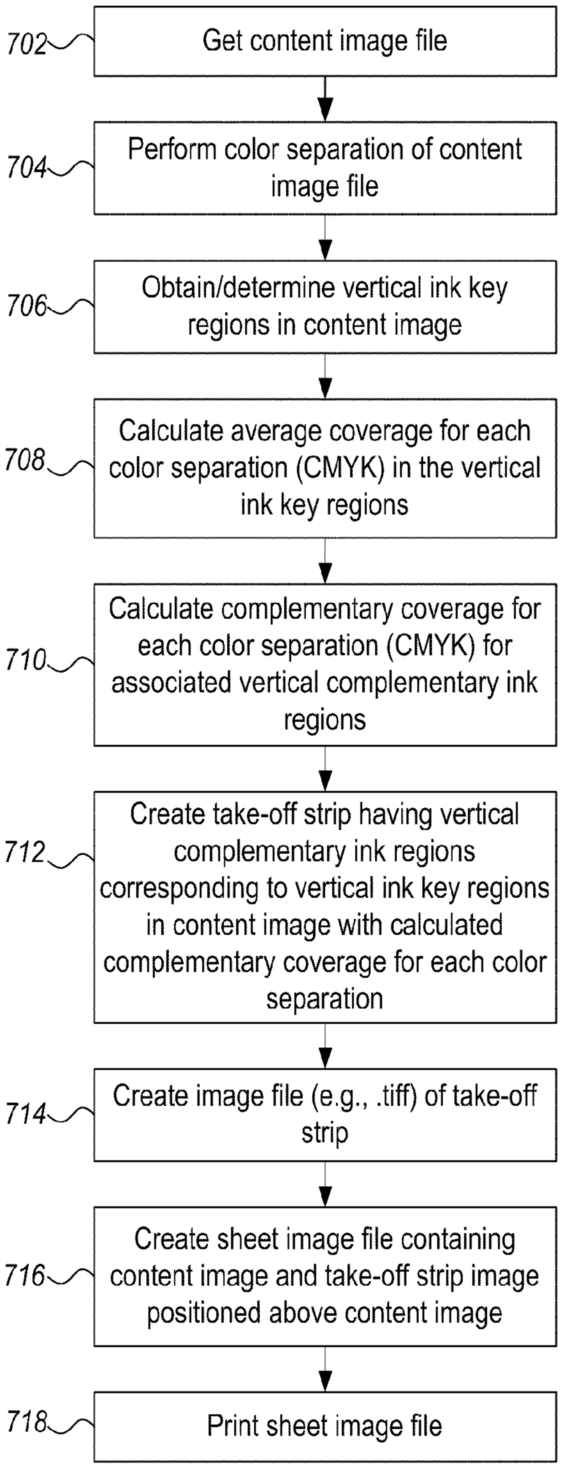
FIG. 7 is an exemplary embodiment of the functionality of the adaptive take-off strip generator.

FIG. 7 is an exemplary embodiment of the functionality of the adaptive take-off strip generator 610. As illustrated therein, the adaptive take-off strip generator 610 obtains or receives access to the content image 605 and performs CMYK color separation of the content image (steps 702, 704). Alternatively, this portion of the functionality can be performed by another software module, the output of which may be used by the adaptive take-off strip generator 610. The adaptive take-off strip generator 610 obtains or determines the vertical ink key regions in the content image (step 706). The vertical ink key regions may be predetermined x-axis segments, for example of equal width, or may be determined dynamically by evaluating the color profile of the content image to intelligently size and map the vertical ink key regions to specific areas (columns) of the content image.

Once the vertical ink key regions are known by the adaptive take-off strip generator 610, it can calculate the average coverage for each color separation in each of the vertical ink key regions (step 708)—that is, the average amount of ink color that is required for each color in each of the vertical ink key regions. Given the average coverage for each color separation in each vertical ink key region, the adaptive take-off strip generator 510 calculates a complementary ink coverage for each color separation for associated vertical complementary ink regions (step 710). The adaptive take-off strip generator 610 creates a take-off strip having vertical complementary ink regions that correspond positionally along the x-axis to the positions of their associated vertical ink key regions of the content image (step 712). The take-off strip is saved as an image file (e.g., a .tiff or other image file) (step 714).

Figure 1:
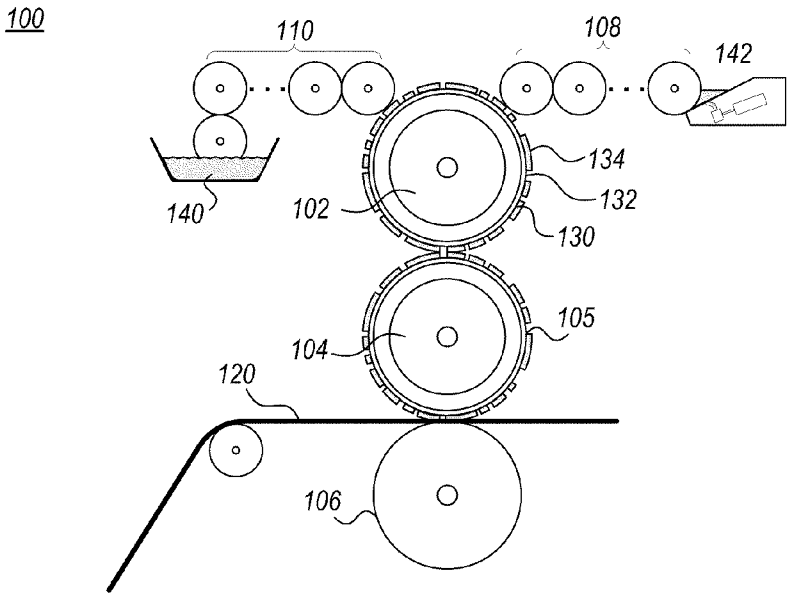
FIG. 1 is a cross-sectional side view of a typical offset printing configuration.
Figure 2:
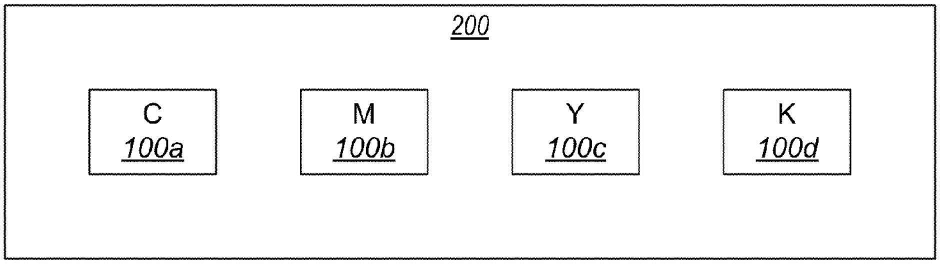
FIG. 2 is a block diagram symbolically representing a CMYK offset printing press.

The adaptive take-off strip generator 610 (or alternatively another software module) then creates a sheet image file containing the complete image to be printed onto the sheet of material. The sheet image file includes the content image and the take-off strip image positioned above the content image (such that the vertical ink key regions and corresponding vertical complementary ink regions align along the x-axis) (step 716). The sheet image file can then be printed using the traditional offset press technique (as discussed in relation to FIG. 1).

In one embodiment, the vertical ink key regions 403_a_-403_j_ and corresponding vertical complementary ink regions 405_a_-405_j_ are preset to 32 mm-wide segments along the x-axis of the content image 605. For each vertical ink key region, the average color coverage for each color is calculated, and a complementary color coverage value for each color is determined. These values are used as the color coverage for its corresponding vertical complementary ink region.

In an alternative embodiment, the width of the x-axis segments may be determined dynamically. For example, the width of each x-axis segment may be adjusted such that the coverage (amount of ink) of each color separation is evenly distributed along the x-axis (or as close to evenly distributed as is practically possible given the application).

The goal of the take off strip 404 is to keep ink consumption for each of the offset printing configurations 100_a_, 100_b_, 100_c_, 100_d_ (i.e., each of the CMYK color separations) at a near-constant value. In order to achieve this, it is desirable to target a mid-coverage value such as 40% or 50% ink coverage for the average ink consumption for a given color. This reflects that in a variety of different images that may be printed, the colors will typically vary such that it is rare to get 100% average ink coverage or 0% average ink coverage. Thus, depending on the types of images to be printed, the thickness of the ink (coverage) may be targeted to a certain level, e.g., 40%, to ensure a near-constant ink thickness, thus smoothing the variations in ink consumption.

In one embodiment, the complementary color profile for each color separation is set to the following:

$$\text{TakeOffStripCoverage\_Channel}=(\text{TargetCoverage\_Channel}-(\text{MainRegionCoverage\_Channel}*\text{MainRegionPercent}))/(1-\text{MainRegionPercent}),$$

Where 0<=TakeOffStripCoverage_Channel<=MaxTakeStripStripCoverage_Channel and where TakeOffStripCoverage_Channel is the percent of ink coverage for the color separation (channel) for the vertical complementary ink region in the take-off strip (i.e., the complementary color profile), the TargetCoverage_Channel is the target value of the average ink coverage for this channel, the MainRegionCoverage_Channel is the percent of ink coverage for the color separation (channel) for the vertical ink key region associated with the vertical complementary ink region, the MainRegionPercent is the amount of the printable area that is taken up by the image (as opposed to the take-off strip), and the MaxTakeOffStripCoverage_Channel is maximum allowed ink coverage for the color separation in the vertical complementary ink region.

For example, referring to the vertical ink key region 403*a*, which contains a lot of red (cmyk(0, 100, 100, 0)) will have a take-off strips that contain the max amount of cyan and black. That is, the specified Red is 100% magenta and 100% yellow. Assuming the height of the take off strip is 20% of the entire height of the printable areas and the height of the product image portion is 80% of the entire height of the printable areas, and the target coverage for each channel is set to 40%, then the complementary color profile for the vertical complementary ink region 405*a* is calculated as follows (also assuming a maximum allowed coverage value MaxTakeOffStripCoverage_Channel=70%):

$$\text{TOS\_Cyan}=(0.4-(0*0.8))/0.2=2$$

but since the maximum allowed coverage value MaxTakeOffStripCoverage_Channel can only be 0.7), TOS_Cyan=0.7

$$\text{TOS\_Magenta}=(0.4-(1*0.8))/0.2=-2$$

but since the minimum value can only be 0, TOS_Magenta=0. TOB_Yellow=ends up being the same as TOB_Magenta. TOB_Black=ends up being the same as TOB_Cyan.

That is, for take-off strip vertical complementary ink region 405*a*, the ink coverage is cmyk(0.7, 0, 0, 0.7). The ink coverage for the color separations of the remaining vertical complementary ink regions 405*b*-405*j* is calculated according to the above formula.

In order to avoid sharp transitions between vertical complementary ink regions 405*a*-405*j*, the edges of the vertical complementary ink regions can be blended to smooth out the transitions.

It will be appreciated that for images to be printed that have a variety of different colors within the vertical ink key region, the ink profile will represent the average ink thickness for the region. For images having many different color profiles across the x-axis, many more vertical complementary ink regions may be utilized to accommodate the many different color profiles.

In summary, the color take-off strip 404 should balance the amount of ink color coverage (ink thickness per color), thereby smoothing the variations in the ink flow across the sheet, across multiple sheets as they are printed, and even from one print job (printing multiple sheets of the same image using the same plate) to the next. This is achieved by obtaining a color profile of the image, determining a complementary color profile to the color profile of the image, and generating a take-off strip embodying the complementary color profile—in other words, by dynamically calculating complementary color profile for the take-off strip to compensate for areas of low/high coverage in the image. For example, when the design goal is an average of 50% coverage per vertical ink key region per color and the image itself uses 30% coverage, the take-off strip will add 10% to end up with 50% in that particular zone.

This technique enables as few change of ink consumption from print job to print job as possible. Even using a few make-ready sheets, the production will be stable sooner than with the prior art approach with non- or fixed-color take-off strips. The methodology described herein combines the advantages of take-off strips when ink has to be reduced and having no take-off strip if ink has to be increased from one print job to the next. Accordingly, customer satisfaction with the print will be higher, and the reprint rate will typically be less, resulting in a cost benefit.

What is claimed is:

1. A method for adaptively generating a take-off strip corresponding to an image to be printed, comprising:

obtaining a color profile of the image to be printed;

determining a complementary color profile to the color profile of the image to be printed;

generating a take-off strip embodying the complementary color profile; and printing the image and the take-off strip embodying the complementary color profile of the image to be printed on the same sheet of material so as to smooth ink consumption when the image to be printed is printed.

2. The method of claim 1, comprising:

generating a print image comprising the image and the take-off strip positioned such that the complementary color profile of the take-off strip is aligned with the color profile of the image.

3. The method of claim 2, comprising:

printing the print image onto a sheet of material.

4. The method of claim 3, comprising:

printing the print image onto a plurality of sheets of material using an offset printing press.

5. The method of claim 2, wherein the image and the take-off strip are positioned relative to one another within the print image such that the take-off strip is printed prior to the image when the print image is printed.

6. The method of claim 2, wherein the image and the take-off strip are positioned relative to one another within the print image such that the take-off strip is printed following the image when the print image is printed.

7. The method of claim 2, wherein the image and the take-off strip are positioned relative to one another within the print image such that the take-off strip is printed in between two or more portions of the image when the print image is printed.

8. The method of claim 1, wherein the step of obtaining a color profile of the image comprises:

determining an amount of color coverage in each of a plurality of color separations that make up the image.

9. The method of claim 8, wherein the plurality of color separations comprises CMYK color separations.

10. The method of claim 8, wherein determining the amount of color coverage comprises determining a plurality of vertical ink key regions in the image and calculating the average coverage for each color separation in each of the vertical ink key regions.

11. The method of claim 10, wherein the step of determining a complementary color profile to the color profile of the image comprises calculating a complementary ink coverage for each color separation for a plurality of the vertical complementary ink regions and the step of generating a take-off strip comprises ordering the plurality of vertical complementary ink regions to correspond positionally along a first axis to the positions of associated vertical ink key regions of the content image, the first axis perpendicular to an axis of transport along which the image is to be printed.

12. One or more non-transitory computer readable storage mediums tangibly embodying program instructions which, when executed by a computer, implement a method for adaptively generating a take-off strip corresponding to an image to be printed, the method comprising:

obtaining a color profile of the image to be printed;

determining a complementary color profile to the color profile of the image to be printed;

generating a take-off strip embodying the complementary color profile; and printing the image and the take-off strip embodying the complementary color profile of the image to be printed on the same sheet of material so as to smooth ink consumption when the image to be printed is printed.

13. The one or more computer readable storage mediums of claim 12, the method comprising:

generating a print image comprising the image and the take-off strip positioned such that the complementary color profile of the take-off strip is aligned with the color profile of the image.

14. The one or more computer readable storage mediums of claim 12, wherein the step of obtaining a color profile of the image comprises:

determining an amount of color coverage in each of a plurality of color separations that make up the image.

15. The one or more computer readable storage mediums of claim 14, wherein the plurality of color separations comprises CMYK color separations.

16. The one or more computer readable storage mediums of claim 14, wherein the step of determining the amount of color coverage comprises determining a plurality of vertical ink key regions in the image and calculating the average coverage for each color separation in each of the vertical ink key regions.

17. The one or more computer readable storage mediums of claim 16, wherein the step of determining a complementary color profile to the color profile of the image comprises calculating a complementary ink coverage for each color separation for a plurality of the vertical complementary ink regions and the step of generating a take-off strip comprises ordering the plurality of vertical complementary ink regions to correspond positionally along a first axis to the positions of associated vertical ink key regions of the content image, the first axis perpendicular to an axis of transport along which the image is to be printed.

18. The system of claim 14, wherein the printing system comprises an offset printing press.

19. A system for adaptively generating a take-off strip corresponding to an image to be printed, comprising:

one or more processors configured to obtain a color profile of the image to be printed, determine a complementary color profile to the color profile of the image, generate a take-off strip embodying the complementary color profile, and print the image and the take-off strip embodying the complementary color profile of the image to be printed on the same sheet of material so as to smooth ink consumption when the image to be printed is printed.

20. The system of claim 19, wherein the one or more processors are further configured to generate a print image comprising the image and the take-off strip positioned such that the complementary color profile of the take-off strip is aligned with the color profile of the image.

21. The system of claim 20, comprising:

a printing system, wherein the one or more processors are further configured to send the print image to the printing system to print the print image onto a sheet of material.

22. The system of claim 19, wherein the one or more processors are configured to determine an amount of color coverage in each of a plurality of color separations that make up the image by determining a plurality of vertical ink key regions in the image and calculating the average coverage for each color separation in each of the vertical ink key regions.

23. The system of claim 19, wherein the one or more processors are configured to calculate a complementary ink coverage for each color separation for a plurality of the vertical complementary ink regions, and to order the plurality of vertical complementary ink regions in the take-off strip to correspond positionally along a first axis to the positions of associated vertical ink key regions of the content image, wherein the first axis is perpendicular to an axis of transport along which the image is to be printed by the printing system.

* * * * *